INVENTORS
HAROLD A. SEBERG
LEO E. FITZGERALD
BY
AGT.

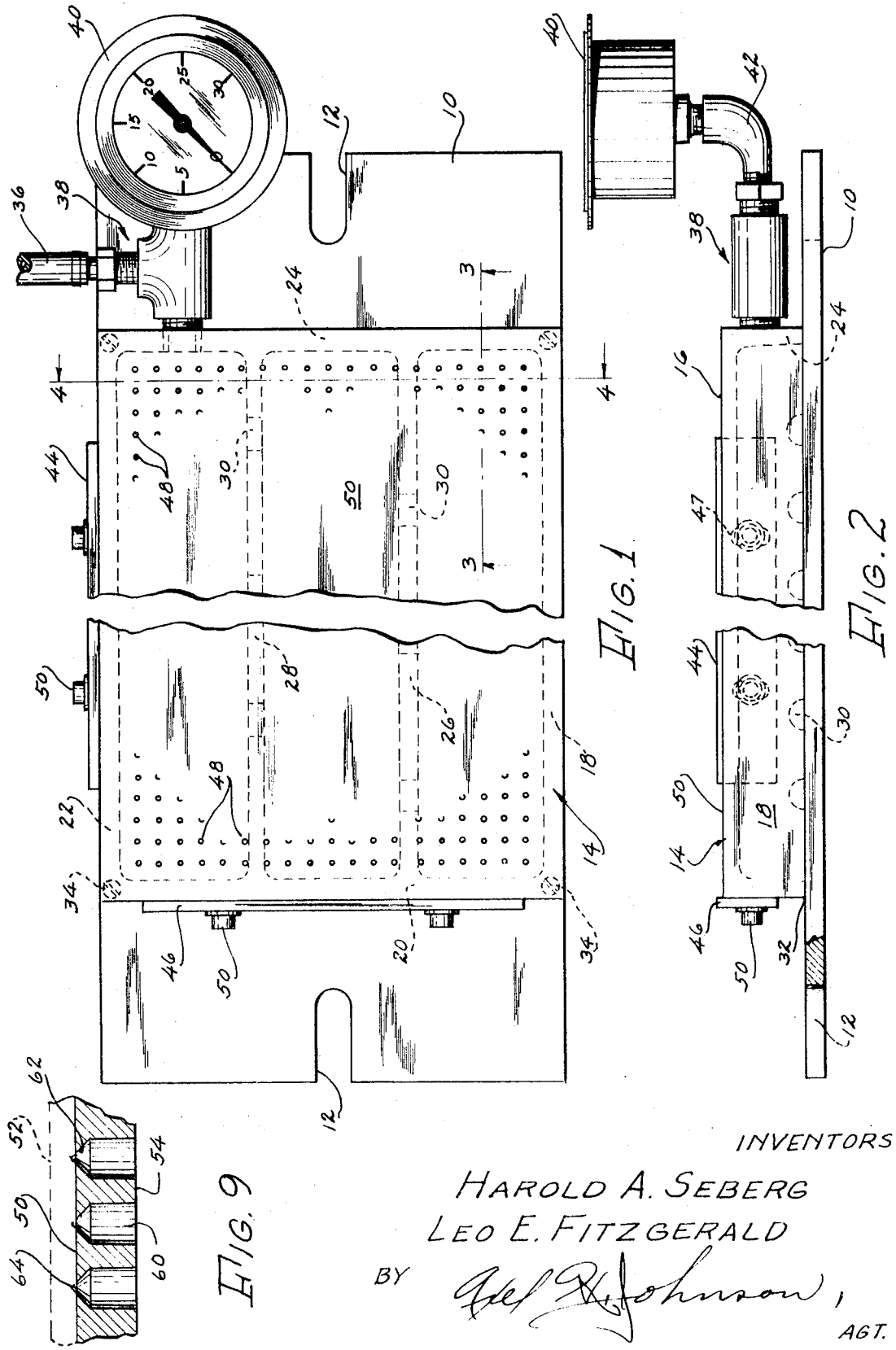

United States Patent Office 3,613,208
Patented Oct. 19, 1971

3,613,208
METHOD OF FABRICATING A PERFORATED PANEL FOR A VACUUM WORK-HOLDER OR CHUCK
Harold A. Seberg, 10741 Spring St., Sturtevant, Wis. 53177, and Leo E. Fitzgerald, 8710 Clover Lane, Racine, Wis. 53406
Filed Aug. 20, 1968, Ser. No. 754,053
Int. Cl. B23p 15/16; B22d
U.S. Cl. 29—163.5 R    2 Claims

ABSTRACT OF THE DISCLOSURE

This disclosure comprises a fixture or chuck employed to hold work-pieces while the latter are being machined, and is especially intended to hold such pieces that cannot be conveniently clamped, or to hold those of non-magnetic material that cannot be held on a magnetic chuck. This disclosure comprises a vacuum chamber provided with orifices in the work-holding surface thereof. A vacuum is maintained in the chamber to hold the work-pieces which have been placed upon the surface, thereby closing the orifices. This disclosure primarily relates to the method of producing the orifices in the surface of the device.

Figure 7:
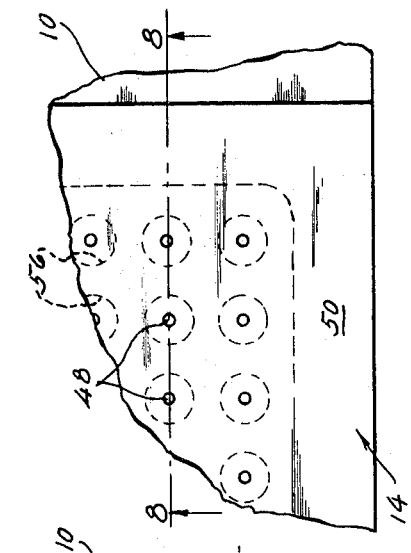

BACKGROUND OF THE INVENTION (1) Field of the invention

This invention concerns a device for holding work to be machined, the holding means being a vacuum engaging the workpiece.

(2) Description of the prior art

The prior art includes similar devices, such as the patents listed below:
Bryant, 3,004,766
Muir, 3,229,953

One problem met with in producing the prior-art devices is the expensive and laborious process of drilling the great number of orifices in the surface of the work-holding panel. The method embraced by the applicants invention eliminates this drilling operation.

SUMMARY

This invention concerns the method of producing the orifices in the work-holding surface of a vacuum fixture or chuck. Prior-art devices of this nature have work-holding surfaces in which the orifices are drilled. These orifices cannot conveniently be punched because of their small diameter, and because the panel containing them must necessarily be of a substantial thickness to avoid distortion by the vacuum necessary to secure the work-pieces against shifting during machining. Drilling the orifices would be a time-consuming operation in that a panel measuring 20 inches by 6 inches may have approximately 1617 orifices. Extremely accurate spacing of the orifices is not important in a device of this nature, nor is the maintaining of a close tolerance with respect to the orifice diameters essential. The novel method of the present application tends to considerably reduce the cost of producing a device of this type. The gist of the invention comprises in casting the metal vacuum chamber with blind cavities positioned on the under surface of the panel and at the location of each orifice. The initial upper surface of the panel as cast, is higher than the final surface thereof, and the upper end of each cavity terminates below this initial surface. The upper or initial surface of the panel is finally machined an amount sufficient to expose or "truncate" the upper ends of the cavities, and thereby produce the orifices.

An object of this invention is to provide a method of producing a plurality of orifices in a surface without requiring individual drilling of each orifice.

Figure 8:
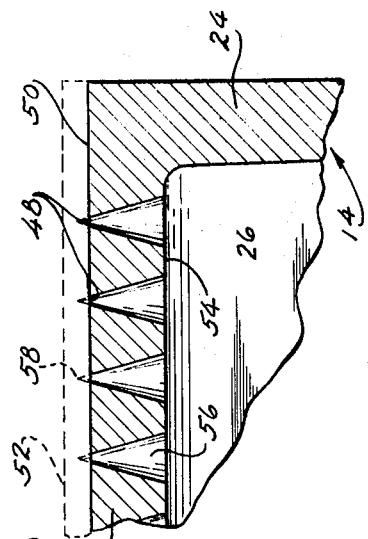
Figure 5:
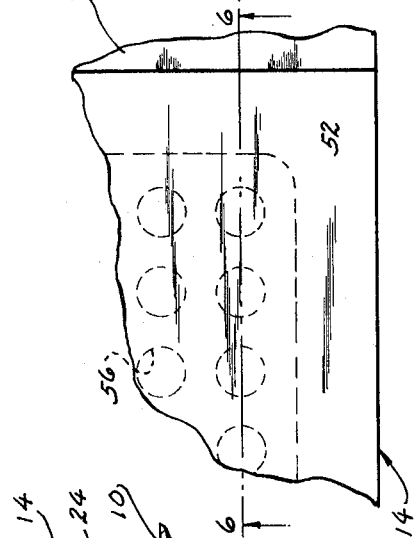
Figure 6:
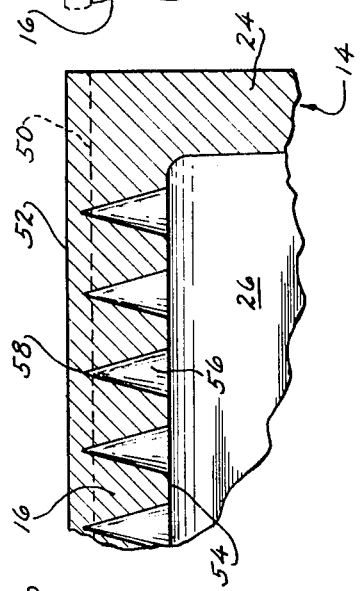
Figure 3:
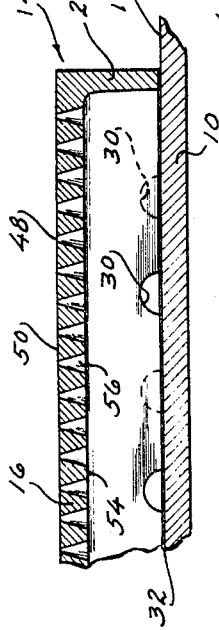
Figure 4:
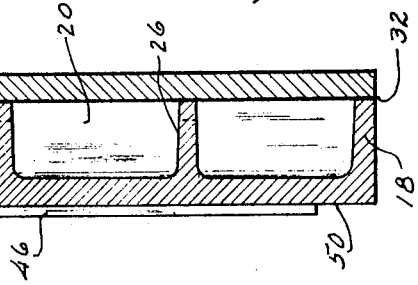

Referring to the drawings:

FIG. 1 is a plan view of a chuck or fixture embracing the invention.
FIG. 2 is an elevational view of the device of FIG. 1.
FIG. 3 is a section taken at 3—3 of FIG. 1.
FIG. 4 is a section taken at 4—4 of FIG. 1.
FIG. 5 is an enlarged plan view of a portion of FIG. 1 as it appears preparatory to machining the upper surface of the panel.
FIG. 6 is a section taken at 6—6 of FIG. 5.
FIG. 7 is an enlarged plan view showing the upper surface of the table after the surface has been machined to expose the orifices.
FIG. 8 is a section taken at 8—8 of FIG. 7.
FIG. 9 is a modification of the cavities otherwise shown in FIG. 8.

The preferred embodiment of the invention comprises a base 10 having slots 12 for the reception of bolts to permit the device to be secured to a machine table. A vacuum chamber 14 of metal cast in the form shown, comprises a panel 16 having walls 18, 20, 22 and 24, which define a downwardly-open chamber. Webs 26 and 28 are cast integrally with chamber 14 and serve to support the table or panel portion 16 against distortion by the vacuum created in the chamber. Passageways 30 are provided in the lower edges of webs 26 and 28 as shown, to permit a uniform vacuum to be maintained in the chambers defined by the webs 26 and 28. The lower edge of chamber 14 is machined, and after a sealing compound 32 is applied thereto, the chamber 14 is affixed to the base 10 by screws such as at 34.

A vacuum sufficient to hold the work pieces to the panel 16 during machining is provided by a vacuum pump, not shown. The pump is connected to the chamber 14 by tubing 36 and suitable fittings such as at 38. A vacuum gauge 40 is mounted as shown, by means of an elbow 42. Gauge 40 indicates the amount of vacuum being maintained, and also gives warning when an unexpected leak occurs.

A pair of stop members 44 and 46 are provided on the side walls of the chamber 14, and have slots 47 and screws 50 to secure the stop members to the chamber. These stop members can be adjusted to a position above the surface of the panel 16 to provide a means of accurately positioning work-pieces. The slots permit the members 44 and 46 to be lowered when they are not used.

The chamber 14 including the panel in the present instance is cast of metal, and is to be finally provided with a plurality of orifices 48 which are spaced uniformly over the surface 50. These orifices in the present instance are spaced approximately ¼ inch apart and ⅟₁₆ inch diameter. The gist of this invention resides in producing this great number of orifices without the laborious task of drilling them.

Referring to FIGS. 5 through 9:

The process employed in producing the vacuum chamber with the orifices comprises casting the chamber with an initial upper surface 52 substantially higher than the final machined work surface 50. The lower surface 54 in this instance has cast therein acutely-angled cone cavities 56, of approximately 30 degrees included angle in this instance. One cavity is provided for each orifice 48, and each cavity having an axis normal to the surface 52 and having its large dimension at the surface 54. The apices 58 of cavities 56 are maintained approximately sharp as possible during the casting operation, and terminate at a uniform distance from the surface 52. The final machining operation comprises the reducing of the surface 52 to the work surface 50 by milling or grinding, thus "truncating" the cone cavities 56, and exposing the orifices 48 simultaneously with the machining of the surface.

The alternate form for producing the cavities is shown in FIG. 9. These cavities 60 are substantially cylindrical but have the necessary draft to permit withdrawing the pattern from the mold. The apices 62 are preferably cone-shaped and terminate below the surface 52. The process, in order to produce the orifices 64 by machining the initial surface 52, is identical with that described with respect to FIGS. 5 to 8.

This method of producing a perforated panel having a large number of orifices requires only a suitable pattern from which can be constructed a sand mold having one projection thereon for each cavity to be provided in the panel. The machining of the surface 52 provides the orifices 48 or 64 when the surface approaches the surface 50, and no additional machining is required.

When this fixture or chuck is being used to hold a workpiece, the latter is placed upon a sheet of suitable card material and a knife is used to cut the outline of the piece. The resulting apertured sheet is placed upon the panel 50 with the work-piece in the opening cut, thereby covering all of the orifices. The vacuum in the chamber will then securely hold the sheet and work-piece. A plurality of work-pieces can also be held in this manner.

It is obvious that this device can be of any convenient form, such as circular to suit the particular use, or the machine on which it will be mounted.

The above being a complete description of an illustrative embodiment of the invention, what is claimed as new and desired to be secured by Letters Patent of the United States is:

1. A method of producing a perforated metal panel adapted for use as the work-holding surface of a vacuum fixture or chuck, said panel having an upper work surface having a great number of spaced orifices of uniform size, the method comprising providing a suitable facsimile pattern from which can be constructed a mold, said mold having spaced and uniformly shaped projections thereon for producing blind cavities in said panel, constructing said mold from said pattern, removing said pattern from said mold, casting molten metal into said mold in order to form a metal panel, said panel having an initial upper surface and a lower surface spaced from said initial upper surface, said lower surface having a great number of discrete, upwardly-directed converging cavities of uniform depth directed toward, and terminating below said initial upper surface, removing the solidified panel from said mold, and machining said initial upper surface to define said upper work surface and to expose said cavities thus producing said orifices.

2. A method as set forth in claim 1, in which said facsimile pattern has cavities that terminate in apices.

References Cited

UNITED STATES PATENTS

| | | | |
|---|---|---|---|
| 1,503,673 | 8/1924 | Upton | 29—163.5 UX |
| 1,665,375 | 4/1928 | MacChesney | 29—163.5 X |
| 2,376,742 | 5/1945 | Wempe | 29—163.5 X |
| 2,442,022 | 5/1948 | Schulz | 164—2 X |

JOHN F. CAMPBELL, Primary Examiner

D. C. REILEY, Assistant Examiner

U.S. Cl. X.R.

29—527.5, DIG 5; 164—76; 248—363; 279—3